UNITED STATES PATENT OFFICE.

JOHN A. WHIPPLE AND WM. B. JONES, OF BOSTON, MASSACHUSETTS.

IMPROVEMENT IN PRODUCING PHOTOGRAPHIC PICTURES UPON TRANSPARENT MEDIA.

Specification forming part of Letters Patent No. 7,458, dated June 25, 1850.

*To all whom it may concern:*

Be it known that we, JOHN A. WHIPPLE and W. B. JONES, of Boston, in the county of Suffolk and State of Massachusetts, have invented certain Improvements in the Art of Taking Photographic Pictures; and we do hereby declare that the following is a full, clear, and exact description of the principle or character which distinguishes them from all other things before known and of the usual manner of making, modifying, and using the same.

The nature of our improvements consists in coating the surface of glass or other suitable media with a film of matter containing metallic and alkaline salts, the precipitation of which produces the various shades and tints of the picture to be taken.

To enable others skilled in the art to use our invention, we will proceed to describe the process, which is as follows. The best of plate-glass, when that material is used, is required for our purposes.

We have used plates of mica and other transparent and even translucent media for taking what are called "negative pictures," which, when placed upon a dark ground or surface, give a positive. Positive pictures may be taken upon any opaque dark surface which will receive the film or coating. For the coating or film we have used various bodies—such as varnishes, gums, milky fluids, gelatinous and albuminous matters—all of which enable us to produce pictures; but we use and prefer a prepared albumen from eggs. The above substances are to be used in combination with chlorine, iodine, bromine, &c., and their components. When albumen is used it is prepared in the following manner: Take the white of eggs, shake or break them, so as to allow the fluid part to filter through cloth, which is then to be exposed to air having the temperature of 60° to 70° Fahrenheit for two weeks. To four fluid ounces of this prepared albumen add a compound formed by mixing seventy grains of hydriodate of potassa or hydriodate of ammonia with eleven grains of crystallized nitrate of silver, dissolved in one and a half drams of water, the whole to be mixed and agitated strongly. After filtering this mixture we wet evenly with it the surface of a plate of clean clear glass, and after draining off the excess we heat the plate and dry the film. We then put into a shallow dish of suitable size to receive the glass a fluid formed by dissolving fifty grains of the crystals of nitrate of silver in one ounce of water, adding to it three pennyweight of strong acetic acid, and place the whole in a darkened room. We then slide into the liquid the prepared plate, so that no air can follow the submerged parts, allowing it to remain under the liquid as short a time as possible. While the plate of glass is still moist we cover its coated side with another plate of glass, having a projecting border near its outer edges to prevent actual contact of the plates and the evaporation of the liquid. The plate is now ready to be exposed in the camera in the usual way for taking daguerreotypes until slight traces of the picture can be perceived. The plate is then removed to a darkened room and immersed or washed in a strong solution of gall-nuts in water, by which the organic compound of silver is speedily produced, and the picture appears, and can be rendered more and more distinct by continued washing in the solution until the full tint is obtained. It is then to be rapidly washed in water, followed by immersion in a saturated solution of hyposulphite of soda, until all the unreduced compounds of silver have been removed, which may be known by the shadows becoming clear and transparent. The picture is then to be rinsed and dried.

The picture thus produced is negative, having the lights dark and opaque and the shadows clear and transparent; but if laid or produced on a dark ground, the light is reflected by the precipitated silver in the lights, and the shadows are formed by the dark ground behind, making a positive picture of it.

Positive copies can be produced from the transparent negative pictures by the following process: The albumen, prepared as above described, is used to dissolve common salt in the proportion of one ounce of albumen to one dram of salt. Glass plates coated with this compound and dried are to be washed over with a solution containing one hundred grains of crystals of nitrate of silver in one ounce of water, and allowed to soak therein some minutes. They must afterward be slightly washed in water, dried, and kept in a dark place till required for use. By placing one of these plates behind one of the negative pictures, as before described, with the films in close contact and exposing the two together to the sunlight, carefully protecting the last plate from all light, except that passing through the negative picture, a positive picture is produced. Any number of these copies may be taken from the same negative picture. The copies are fixed or rendered permanent by using the solution of hyposulphite of soda, as before, to remove all unaltered compounds. The colors can be deepened by the use of water acidulated by sulphuric acid. Instead of a film on glass the ordinary sensitive paper may be used, and the pictures then resemble talbotypes, except that they are more clearly defined.

What we claim as our invention, and desire to secure by Letters Patent, is—

1. The taking of photographic pictures upon transparent media by coating them with some suitable vehicle for the sensitive materials, substantially as set forth.

2. The process of preparing and using the sensitive coating or film upon surfaces, whether of transparent, translucent, or opaque bodies, substantially in the manner and for the purposes set forth.

JOHN A. WHIPPLE.
WM. B. JONES.

Witnesses:
EMORY WASHBURN,
C. EAMES.